United States Patent [19]

Buchanan

[11] Patent Number: 5,709,406
[45] Date of Patent: Jan. 20, 1998

[54] HYBRID INFLATOR WITH PROJECTILE GAS RELEASE

[75] Inventor: Eric S. Buchanan, North Ogden, Utah

[73] Assignee: Morton International, Inc., Chicago, Ill.

[21] Appl. No.: 608,585

[22] Filed: Feb. 28, 1996

[51] Int. Cl.⁶ ........................................ B60R 21/26
[52] U.S. Cl. ............... 280/737; 280/736; 280/741; 102/531; 222/5
[58] Field of Search ........................ 280/736, 737, 280/740, 741, 742; 222/3, 5; 102/530, 531

[56] References Cited

U.S. PATENT DOCUMENTS

| | | | |
|---|---|---|---|
| 3,788,667 | 1/1974 | Vancil | 280/150 AB |
| 3,797,853 | 3/1974 | Grosch et al. | 280/150 AB |
| 3,836,170 | 9/1974 | Grosch et al. | 280/150 AB |
| 3,856,180 | 12/1974 | Merrell | 222/5 |
| 3,856,181 | 12/1974 | Merrell | 222/5 |
| 3,865,273 | 2/1975 | Zeigler | 222/5 |
| 3,868,124 | 2/1975 | Johnson | 280/150 AB |
| 3,869,143 | 3/1975 | Merrell | 280/150 AB |
| 3,944,249 | 3/1976 | Smith et al. | 280/150 AB |
| 3,948,540 | 4/1976 | Meacham | 280/150 AB |
| 3,960,390 | 6/1976 | Goetz | 280/150 AB |
| 3,966,225 | 6/1976 | Marlow | 280/737 |
| 3,966,226 | 6/1976 | Roth | 280/737 |
| 3,966,228 | 6/1976 | Neuman | 280/737 |
| 3,968,980 | 7/1976 | Hay | 280/734 |
| 5,062,367 | 11/1991 | Hayashi et al. | 280/741 |
| 5,076,607 | 12/1991 | Woods et al. | 280/737 |
| 5,139,280 | 8/1992 | Cord et al. | 280/741 |
| 5,184,846 | 2/1993 | Goetz | 280/736 |
| 5,199,740 | 4/1993 | Frantom et al. | 280/743 |
| 5,217,697 | 6/1993 | Kanazawa et al. | 280/743 |
| 5,226,668 | 7/1993 | Delonge-Immik et al. | 280/737 |
| 5,259,644 | 11/1993 | Albrecht et al. | 280/741 |
| 5,344,186 | 9/1994 | Bergerson et al. | 280/741 |
| 5,348,344 | 9/1994 | Blumenthal et al. | 280/737 |
| 5,350,192 | 9/1994 | Blumenthal | 280/737 |
| 5,364,127 | 11/1994 | Cuevas | 280/741 |
| 5,423,570 | 6/1995 | Kort et al. | 280/736 |
| 5,437,472 | 8/1995 | Kuretake et al. | 280/737 |
| 5,462,307 | 10/1995 | Webber et al. | 280/737 |
| 5,516,147 | 5/1996 | Clark et al. | 280/737 |
| 5,588,676 | 12/1996 | Clark et al. | 280/741 |
| 5,593,180 | 1/1997 | Cuevas et al. | 280/737 |
| 5,630,619 | 5/1997 | Buchanan et al. | 280/737 |

FOREIGN PATENT DOCUMENTS

| | | | |
|---|---|---|---|
| 0639483 | 2/1995 | European Pat. Off. | 280/736 |
| 2443267 | 3/1975 | Germany | 280/741 |

*Primary Examiner*—Eric D. Culbreth
*Attorney, Agent, or Firm*—Taylor J. Ross; Gerald K. White

[57] ABSTRACT

A hybrid adaptive airbag inflator with initially low pressure upon deployment. The inflator includes two separate chambers, each containing a quantity of stored inert gas. Each chamber additionally includes a heating device to heat the stored gas. To provide adaptive performance, one, or the other, or both of the heating devices may be fired, depending upon the severity of the collision. At least one of the chambers includes a quantity of gas generating material associated with a projectile. The heating device causes combustion of the gas generating material, which in turn causes the projectile to move and pierce a burst disc sealing the chamber. This permits the gas to exit the inflator before substantial heating of the stored gas, and thus at a lower pressure, to reduce the possibility of the cushion injuring the passenger.

20 Claims, 1 Drawing Sheet

HYBRID INFLATOR WITH PROJECTILE GAS RELEASE

BACKGROUND OF THE INVENTION

1. Field of the Invention

The present invention relates in general to passive restraint airbag systems. In particular, the present invention relates to an improved hybrid inflator for airbag systems providing a projectile to initiate gas release being capable of adaptive performance.

2. Description of the Related Art

In airbag systems there is typically a cushion which, upon a collision, is inflated to provide protective cushioning to the passenger. To inflate the cushion such systems employ an inflator. Various inflators operating upon different principles are known. For each operating principle, there is a slight difference in performance such as the rise and fall of pressure in the cushion over time. As such, for different applications, inflators operating on different principles are preferred.

One known class of inflator is referred to as hybrid. In hybrid inflators, there is a pressure vessel containing a quantity of pressurized inert gas. To fill a cushion simply with stored gas would require a large quantity of the gas, resulting in a large inflator. To reduce size and weight, hybrid inflators exploit the principle that the pressure of a gas increases with temperature. Therefore, hybrid inflators include various types of heaters which heat the gas before it is released from the inflator. This permits a lesser quantity of gas to be stored, greatly reducing inflator size.

To permit the stored inert gas to be sufficiently heated to attain the desired pressure, it has been common to seal the pressure vessel with a burst disc. The burst disc has a predetermined failure pressure, and thus retains the stored, heated gas until a desired pressure is reached, and then ruptures to permit the gas to escape to the cushion. While this has been acceptable, the burst disc often causes the initial pressure to be too high. This causes the cushion to inflate too rapidly, and move toward the passenger at a high speed. If the inflating cushion impacts against the passenger, it can cause injury, and is often referred to as "bag slap". It would therefore be desirable to release the stored gas at a lower pressure than normally permitted with burst discs.

Additionally, there has been a growing desire to provide adaptive airbag systems. Adaptive systems tailor airbag performance to various criteria, such as ambient temperature (which affects gas pressure as noted above), severity of the collision, position of the passenger, etc. As an example, an adaptive airbag system could sense whether the collision is moderate or serious. If the collision is moderate, a lesser quantity of gas is used to inflate the cushion. If the collision is serious, a greater quantity of gas is used, providing a "harder" cushion to provide the increased protection required.

SUMMARY OF THE INVENTION

An object of the present invention is to provide a hybrid inflator which reliably provides gas to a protective cushion.

Another object of the present invention is to provide such an inflator which releases the gas early in the heating process to provide a more gentle pressure curve, reducing the possibility of "bag slap".

Yet another object of the present invention is to provide such an inflator which includes a mechanical rupturing of the burst disc to open the burst disc at a time earlier than possible using simply gas pressure.

A further object of the present invention is to provide such an inflator having the capability of adaptive performance.

These and other objects are achieved by a hybrid adaptive airbag inflator with initially low pressure upon deployment. The inflator includes two separate chambers, each containing a quantity of stored inert gas. Each chamber additionally includes a heating device to heat the stored gas. To provide adaptive performance, one, or the other, or both of the heating devices may be fired, depending upon the severity of the collision. At least one of the chambers includes a quantity of gas generating material associated with a projectile. The heating device causes combustion of the gas generating material, which in turn causes the projectile to move and pierce a burst disc sealing the chamber. This permits the gas to exit the inflator before substantial heating of the stored gas, and thus at a lower pressure, to reduce the possibility of the cushion injuring the passenger.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
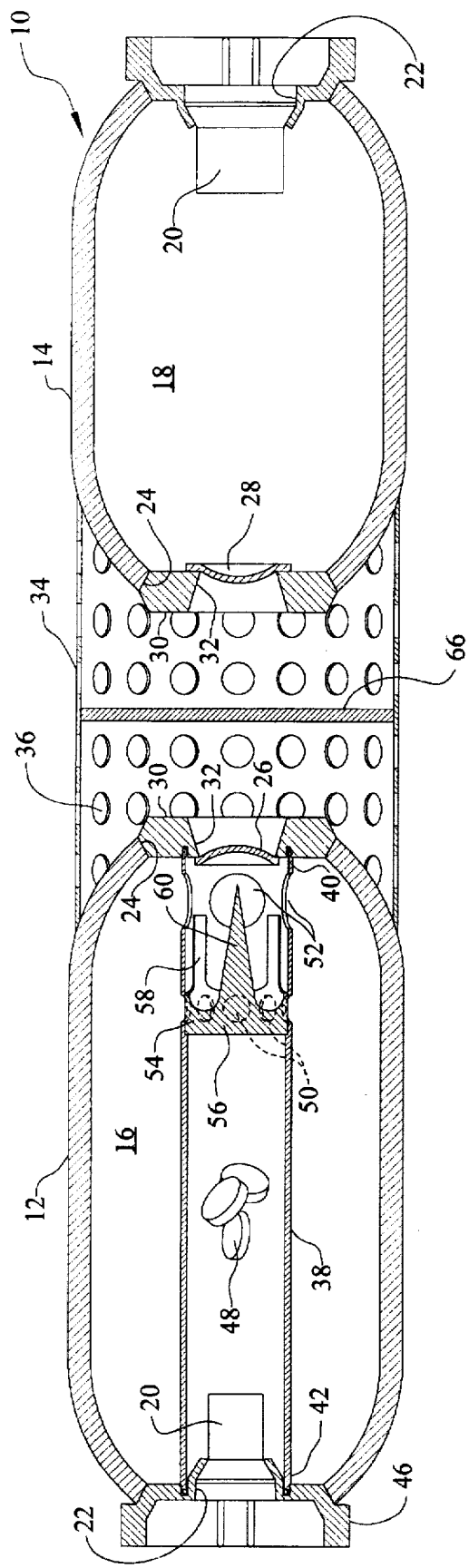
FIG. 1 is a cross-sectional side view of an inflator according to the invention, with a projectile in the initial, unfired position.

With reference to FIG. 1, a first embodiment of an inflator according to the present invention is generally designated by reference numeral 10. The inflator 10 includes at least a first pressure vessel 12, and preferably a second pressure vessel 14. While various forms are possible, such as spherical, etc., it is preferred that each of the vessels have a generally cylindrical shape.

Each of the vessels 12 and 14 forms a chamber 16 and 18, respectively. These chambers will each hold a quantity of stored inert gas. The quantity in each chamber may be equal, or may be unequal. If unequal quantities are employed, these chambers may be of different size or shape to accommodate the different quantity. Additionally or alternatively, each chamber may store the inert gas under different pressures.

Each chamber will include a heating device 20. The heating device may take various forms. It is preferred that the heating device be formed by a pyrotechnic initiator mounted in an appropriate mounting hole 22 in the wall of the pressure vessel. Other devices, such as self-contained fluid fueled heating devices, could also be employed. As with the quantities of gas, the size, and more particularly heat output, of the two heating devices may be equal or unequal.

Each of the pressure vessels will also include an exit orifice 24, which provides communication to the associated chamber. In the embodiment shown, the pressure vessels are oriented such that the two exit orifices are in spaced, opposed relation. While this is preferred, it is not required.

The first and second pressure vessels are provided with first and second burst discs 26 and 28, respectively, which block the associated exit orifice. As such, each burst disk blocks communication between the associated chamber and a cushion (not shown) to seal the associated chamber against escape of the inert gas. As is known in the art, the burst disks are designed such that they will fail above a predetermined pressure in the associated chamber, as described more fully below.

As shown, the vessels may each be provided with an outlet ring 30 having a generally annular form. The outer periphery of the outlet ring may be secured to the outlet orifice, with the inner periphery of the ring forming an outlet 32. The burst discs may be mounted upon the outlet rings 30, 32 in covering relation to the outlet. Alternative arrangements are also possible. For example, the burst discs could be mounted over the exit orifice of the pressure vessel. In a general sense, both the outlet orifice and the outlet may be encompassed by the term "exit".

As may be envisioned, upon failure of either of the burst discs the gas from the associated pressure vessel(s) will flow from the associated cavity. To disperse the flow of gas, there may be provided a diffuser 34. The diffuser may advantageously take the form of a cylindrical section extending between the pressure vessels to encompass the outlet orifices. The diffuser will include numerous diffuser ports 36 through which the gas may flow.

While the above description provides the basics of an adaptive hybrid airbag inflator, such an inflator would expel the gas only upon reaching a sufficient pressure to rupture the burst disc(s). As noted above, this often occurs at a pressure which is higher than desired. As such, the present invention provides an arrangement for causing rupture of at least one of the burst discs at a lower pressure.

Specifically, as is best shown in FIG. 1, the first pressure vessel includes a containment tube 38. The tube 38 has front and rear ends 40 and 42, respectively, with the front end 40 encompassing the first burst disc 26. The front end is fixed with respect to the vessel, such as by welding the front end about the exit orifice. Alternatively, the front end may be threaded on its exterior, and be in threaded engagement with a threaded groove 44 formed in the outlet ring 30, as shown. For such a threaded connection, it is preferred that there be provided an appropriate gas seal, such as an O-ring formed of high temperature rubber.

The rear end of the containment tube may extend freely within the chamber, but is preferably secured to the opposite end of the pressure vessel. As before, the rear end could be welded (or adhesively secured) to the opposite end. It is preferred, however, that an end cap 46 be provided opposite the outlet opening, with the end cap and tube rear end being secured together by threaded engagement similar to the front end. A gas seal, such as an O-ring, is again preferred for such a threaded engagement.

The containment tube houses a quantity of gas generating material 48. This may be any type of material which, upon application of heat, will produce a quantity of high temperature gas. As examples, sodium azide in powder, pellet or wafer form may be housed in the tube. Alternatively, an oxidizing gas such as oxygen or nitrous oxide may be sealed in the tube.

To cause the gas generating material to produce the gas, a heat source is required, and the heating device 20 provides such a source. As such, the heating device must be operatively associated with the gas generating material, and thus the interior of the tube. While an initiator could extend into the tube radially from a position intermediate the front and rear ends, it is preferred that the rear end of the tube encompass the heating device. In the preferred arrangement, the mounting hole 22 for the initiator is formed through the end cap 46 at a positioned to be encompassed by the rear end of the tube 38. As such, the heating device 20 will also be encompassed by the rear end of the tube, as shown in FIG. 1.

The gas generated by the material 48 must of course exit the tube to mix with the stored inert gas to raise the temperature (and thus pressure) of the inert gas. The containment tube is therefore provided with a plurality of tube outlet ports 50 adjacent the front end of the tube. Further, since the heated inert gas must exit the chamber, and the tube encompasses the first burst disc, the containment tube is also provided with a plurality of through ports 52 adjacent the front end of the tube. As shown, the through ports will be located intermediate the burst disc and the outlet ports 50. In this manner, and as will be described more fully below, the hot gas from the material 48 will exit the tube through the outlet ports, heat the inert gas, and the heated inert gas will then pass through the through ports 52 to the burst disc, and thus exit the chamber.

Mounted within the tube 38 between the gas generating material 48 and the first burst disc 26 is a blocking projectile 54. As shown, the projectile has a collar portion 56 having a diameter sized to require a press fit within the tube 38. The collar portion 56 also has a longitudinal length greater than the diameter of the tube outlet ports 50. Extending from the periphery of the collar portion are a plurality of abutment fingers 58, having free ends adjacent the burst disc 26. As shown, the abutment fingers are spaced about the periphery of the collar, for reasons made apparent below. Finally, the projectile includes a nicking prong 60 extending from a central portion of the collar toward the burst disc. As may be seen, the free end of the nicking prong is tapered to a sharp point. This point may be conical or prismatic.

The projectile 54 may move from an initial position to a final position under a sufficient force to overcome the press fit. This force is supplied by the pressure created in the tube by the ignition of the gas generating material 48. Specifically, in the initial position of the projectile, shown in FIG. 1, the collar portion 56 overlies the tube outlet ports 50. To assist in this positioning, the front end of the tube may include a reduced thickness section defining a forward facing shoulder 62 on the inner face of the tube, with the shoulder positioned such that abutment of the collar portion against the shoulder will result in proper positioning.

Since the outlet ports are initially blocked, the gas generating material has no outlet for the generated gas, and the pressure within the tube increases. At some predetermined point the pressure will be sufficient to overcome the press fit of the projectile, and the projectile will move towards the front end of the tube. This movement uncovers the outlet ports 50, permitting the hot gas to enter the first chamber 16 and begin mixing with the stored inert gas.

Figure 2:
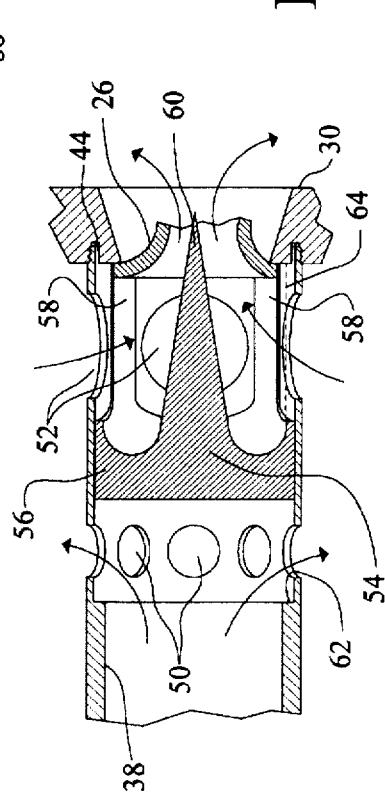
FIG. 2 is a cross-sectional detail view showing the projectile of FIG. 1 in the final, forward position.

The forward movement of the projectile also brings the nicking prong 60 into engagement with the first burst disc 26, introducing a flaw into the burst disc. The disc 26 is already under load due to the pressure of the stored inert gas, and this load is beginning to increase slightly due to the mixing of the stored gas with the hot gas from the tube. Under this loading, the flaw induced in the burst disc by contact with the nicking prong is sufficient to cause the first burst disc to rupture. Further forward movement of the projectile is halted at this point by abutment of the free ends of the abutment fingers against the interior of the pressure vessel, or in this case against the inner face of the outlet ring 30. In this regard, it is noted that the use of the threaded groove 44 requires that the abutment fingers be sufficiently thick to bridge the groove (as illustrated by dashed line 64 in FIG. 2), or that the length of the abutment fingers be sufficient to halt movement of the projectile at the desired position.

At this time the projectile has reached its final position. In this final position the collar portion 56 is intermediate the outlet ports 50 and the through ports 52. Additionally, the peripheral spacing of the abutment fingers assures that the abutment fingers do not substantially block the through ports. As such, the stored inert gas, which has just begun mixing with the hot gas from the tube may begin to exit the first chamber via the through ports 52 and ruptured burst disc 26. The gas generating material 48 will continue to produce hot gas for some period of time after rupture of the burst disc, and this hot gas will continue to mix with the inert gas remaining in the chamber, and this mixture will continue to flow from the chamber. It is noted that the projectile blocks the hot gas in the tube from flowing directly to the burst disc. In this manner the gas is released from the chamber at a lower pressure than would be possible through the use of only a burst disc, providing a much more gentle pressure curve and reducing the possibility of bag slap.

It is noted that a containment tube and projectile could also be used in the second pressure vessel if desired. However, it is preferred that the second vessel contain a lesser amount of gas, and be used only for adding to the gas from the first vessel, such as for severe collisions. If this is the case, the gas from the second vessel would typically be released after that of the first vessel, and at a time when the cushion is substantially, if not fully, inflated. As such, a gentle pressure curve from the second vessel will not influence cushion deployment, and rupturing the second burst disc by gas pressure only is acceptable. All that is needed in the second vessel, therefore, is the heating device 20 to increase the stored gas pressure, and the added expense of a second tube and projectile may be avoided.

The inflator described above provides an adaptive amount of inflation gas which may be tailored to the needs of a particular collision. Further, the inflation gas is supplied at a lower initial pressure, providing for a smooth, safe deployment of the cushion. While these basic characteristics are provided with the basic embodiment shown, other variations may be made to provide other advantages or performance features. As an example, for the opposed exit orifice arrangement shown, there may be provided an impingement wall 66 between the two orifices 24. As may be envisioned, the gas from the vessels will impinge upon wall 66 and then turn radially outward to flow through the diffuser. During this impingement, however, particulate material entrained in the gas, such as small pieces of the ruptured burst discs, may adhere to the wall 66. As such, the wall 66 acts as a filter for the gas. Other variations consistent with the operation of the inflator 10 may also be employed as desired.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An adaptive hybrid airbag inflator, comprising:
    first and second chambers, each containing a quantity of stored inflation gas, and having an exit;
    a burst disc sealing each of said exits;
    a heating device operatively associated with each of said chambers;
    a quantity of gas generating material mounted within at least one of said chambers, said material being operatively associated with said heating device of said chamber for ignition of said material;
    a projectile mounted in said one of said chambers, said projectile including a nicking prong for inducing a flaw into an associated one of said burst discs, said projectile being movable between initial and final positions, in said initial position said nicking prong being spaced from said associated burst disc, and in said final position said nicking prong being in engagement with said associated burst disc, said projectile being mounted such that ignition of said gas generating material moves said projectile from said initial to said final position.

2. An inflator as in claim 1, wherein said exits are in spaced, opposed relation.

3. An inflator as in claim 2, further comprising a diffuser surrounding said exits.

4. An inflator as in claim 3, further including an impingement wall mounted to said diffuser intermediate said exits.

5. An inflator as in claim 1, further including a containment tube in said one chamber, said tube having a front end encompassing said exit and containing said gas generating material, said tube including a plurality of through ports extending therethrough adjacent said front end, said projectile further including a collar portion engaging said tube, said nicking prong extending from said collar portion, and said projectile further including a plurality of abutment fingers extending from said collar portion, said projectile, when in said final position, having said abutment fingers in abutment with said one chamber, and said through ports being intermediate said collar portion and said exit.

6. An inflator as in claim 5, wherein said exits are in spaced, opposed relation.

7. An inflator as in claim 6, further comprising a diffuser surrounding said exits.

8. An inflator as in claim 7, further including an impingement wall mounted to said diffuser intermediate said exits.

9. An inflator as in claim 5, wherein said confinement tube further includes a plurality of tube outlet ports extending therethrough, said projectile, when in said initial position, having said collar portion blocking said outlet ports, and when in said final position, having said collar portion intermediate said outlet ports and said through ports.

10. An inflator as in claim 9, wherein said exits are in spaced, opposed relation.

11. An inflator as in claim 10, further comprising a diffuser surrounding said exits.

12. An inflator as in claim 11, further including an impingement wall mounted to said diffuser intermediate said exits.

13. An inflator as in claim 9, wherein said one chamber further includes an end cap opposite said exit, and wherein a rear end of said tube is secured to said end cap, said end cap further mounting said one heating device in a position such that said rear end of said tube encompasses said one heating device.

14. An inflator as in claim 13, wherein said exits are in spaced, opposed relation.

15. An inflator as in claim 14, further comprising a diffuser surrounding said exits.

16. An inflator as in claim 15, further including an impingement wall mounted to said diffuser intermediate said exits.

17. A hybrid airbag inflator, comprising:

a chamber containing a quantity of stored inflation gas, and having an exit;

a burst disc sealing said exit;

a containment tube mounted within said chamber and having a first end encompassing said exit, said tube including a plurality of outlet ports and a plurality of through ports, said through ports being intermediate said outlet ports and said exit;

a quantity of gas generating material mounted within said tube;

a heating device operatively associated with said gas generating material to cause ignition of said material;

a projectile mounted in said tube for movement between an initial position and a final position upon ignition of said gas generating material, in said initial position said projectile blocking said outlet ports, and in said final position said projectile being located intermediate said outlet ports and said through ports, said projectile including a nicking prong spaced from said burst disc in said initial position, and engaging said burst disc in said final position.

18. An inflator as in claim 17, wherein said projectile includes a collar portion engaging said tube, and said nicking prong extends from said collar portion, said collar portion being in overlying relation to said outlet ports in said initial position.

19. An inflator as in claim 18, wherein said projectile further includes a plurality of abutment fingers extending from said collar portion, said abutment fingers engaging said chamber in said final position to prevent further movement of said projectile.

20. An inflator as in claim 19, wherein said a rear end of said tube is secured to said chamber at a position opposite said exit, and said rear end of said tube encompasses said heating device.

* * * * *